United States Patent Office  3,740,204
Patented June 19, 1973

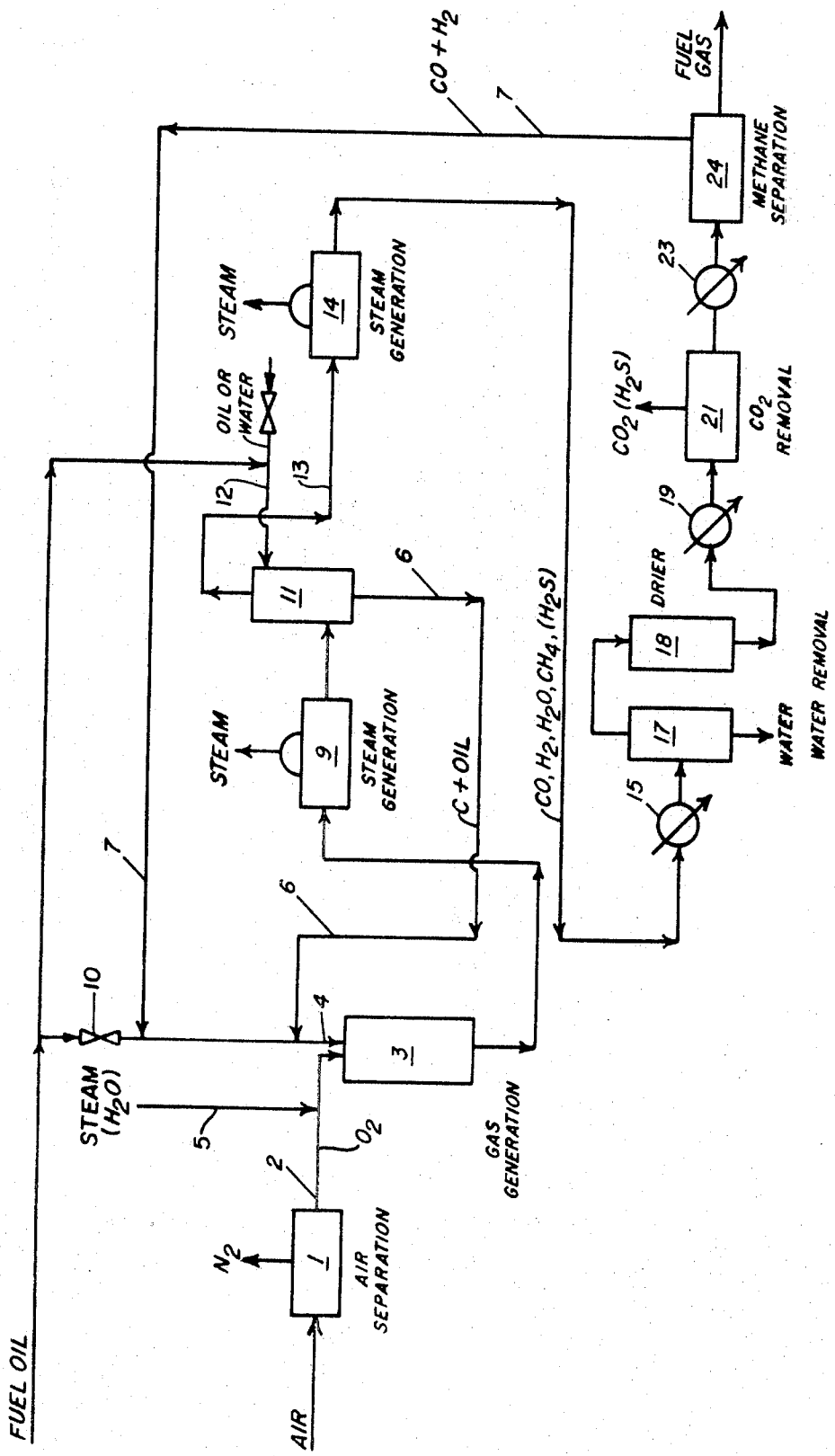

3,740,204
PROCESS FOR THE PRODUCTION OF METHANE FROM CARBONACEOUS FUELS
William L. Slater, La Habra, and Warren G. Schlinger, Pasadena, Calif., assignors to Texaco Inc., New York, N.Y.
Filed May 18, 1971, Ser. No. 144,602
Int. Cl. C01b 2/14
U.S. Cl. 48—215                                           9 Claims

ABSTRACT OF THE DISCLOSURE

A process for the production of methane from carbonaceous fuels of greater molecular weight than methane by a non-catalytic, direct partial oxidation reaction in which the carbonaceous fuel and oxygen are reacted in the presence of hydrogen and carbon monoxide, optionally with the addition of steam, at an autogenous temperature in the range of 1200 to 2200° F. and at a pressure in the range of 300 to 4500 pounds per square inch. Carbon monoxide and hydrogen from the product are preferably totally recycled to the reaction so that ultimate products of the process are methane, carbon dioxide, and hydrogen sulfide if the carbonaceous fuel contains sulfur. Substantially pure methane, suitable as fuel gas or pipeline gas may be produced from relatively low grade fuels and transported by pipeline to points of consumption.

BACKGROUND OF THE INVENTION

Field of the invention

This invention relates to a process for the production of methane. In one of its more specific aspects, the present invention relates to the production of methane-rich gas directly by partial oxidation of a hydrocarbonaceous fuel with oxygen in the presence of carbon monoxide and hydrogen.

Description of the prior art

Gaseous mixtures of hydrogen and carbon monoxide containing minor amounts of carbon dioxide, nitrogen and methane are produced commercially by partial oxidation of carbonaceous fuels, such as gaseous or liquid hydrocarbons, asphalt, lignite, coal, and petroleum coke with substantially pure oxygen. Steam is employed as a reactant in the partial combustion of higher molecular weight fuels, i.e., those containing less than about 3 atoms of hydrogen per atom of carbon. In the production of mixtures of hydrogen and carbon monoxide, or synthesis gas, by non-catalytic partial oxidation, the temperature in the reaction zone is maintained within the range of 1800° F. to 3500° F., usually within the range of from about 2200° F. to about 3000° F.

Usually the methane content of the products of reaction in the partial oxidation processes for the generation of synthesis gas is within the range of 0 to 3 mole percent of the total reaction products. Typically gas mixtures from the commercial partial oxidation processes have methane contents in the range of 0.1 to 2 mole percent and a maximum gross heating value of about 350 British thermal units (B.t.u.) per standard cubic foot (s.c.f.).

Numerous processes have been proposed for producing fuel gases containing substantial amounts of methane from carbonaceous fuels, such as heavy petroleum oils and solid fossil fuels. In general these processes fall into two main categories. In one, hot gases resulting from the partial oxidation of the original fuel, i.ee., oil or coal, are contacted at elevated temperature with liquid hydrocarbons to produce methane and other normally gaseous hydrocarbons by cracking the hydrocarbons. In the second method, the higher molecular weight carbonaceous fuels are converted to carbon monoxide and hydrogen by reaction with oxygen, steam, or mixtures of oxygen and steam at elevated temperatures, the relative proportions of hydrogen and carbon monoxide adjusted to three volumes of hydrogen per volume of carbon monoxide, the mixture purified, and finally passed into contact with a catalyst at suitable temperature and pressure to produce methane by synthesis. The process is usually carried out at temperatures in the range of 250 to 350° C. (482 to 662° F.) in the presence of a nickel or cobalt catalyst at relatively low pressure.

In the process described herein, the methane content of the effluent gas from the reactor is of the order of 10 to 30 mol percent. By suitable purification steps, the carbonaceous fuel supplied to the process may be converted substantially completely to methane and by-produce carbon dioxide.

SUMMARY

The present invention provides a process for the production of fuel gas from a carbonaceous fuel of higher molecular weight than methane by introducing oxygen, steam, carbon monoxide, hydrogen and carbonaceous fuel into an unpacked reaction zone maintained at a pressure within the range of 300 to 4500 p.s.i. (20 to 300 atmospheres) and an autogenous temperature within the range of 1200 to 2200° F. (650 to 1200° C.) wherein the relative amounts of said oxygen and said carbonaceous fuel are within the range of 0.6 to 1.0 atom of oxygen per atom of carbon contained in said fuel and sufficient to ensure conversion of at least 70 percent of the carbon contained in said carbonaceous fuel to gaseous products of reaction and the relative proportions of $H_2O$ to carbonaceous fuel are within the range of 0 to 2.0 pounds of $H_2O$ per pound of carbonaceous fuel and sufficient to maintain the average temperature in said reaction zone within said temperature range; an effluent stream of reaction products comprising carbon monoxide, hydrogen, methane, carbon dioxide and water vapor is discharged from said reaction zone; water and carbon dioxide are separated from the effluent stream; methane-rich gas is recovered from the effluent stream; and residual products of reaction consisting essentially of carbon monoxide and hydrogen are returned to the reaction zone to supply hydrogen and carbon monoxide for the reaction.

By the process of this invention, fuel gas of high B.t.u. content may be produced directly from carbonaceous fuels of higher molecular weight than methane by direct partial oxidation of the carbonaceous fuel in a non-catalytic, free flow reaction zone in accordance with the process of this invention. Carbon monoxide and hydrogen from any suitable source can be employed. A sufficient quantity of steam is supplied to the reaction zone to maintain an autogenous reaction temperature within the range of 1200 to 2200° F. while maintaining the oxygen to carbon ratio of the fuel within the range of about 0.6 to 1.0 atom of oxygen per atom of carbon in the fuel. Free carbon, or soot, is produced in the reaction and may be returned to the reaction zone as part of the carbonaceous fuel supplied thereto. Solid carbon, but not carbon oxides, is included as part of the carbonaceous fuel in determining the oxygen to carbon limits for the reaction. Water or steam is desirably supplied to the reaction zone to moderate the reaction temperature and maintain the average temperature in the reaction zone within the specified range, and to supply hydrogen by the reaction of steam with carbon and carbon monoxide from the fuel. Water may be supplied to the reactor either as steam or as liquid water. When liquid water is introduced to the reaction zone, the temperature moderating effect is considerably greater than when steam in an equivalent amount is employed. In determining the oxygen to carbon limits for the reaction, only free oxygen is included, and not combined oxygen contained in steam or carbon oxides.

The pressure in the reaction zone may vary from about 20 atmospheres (300 p.s.i.) to about 300 atmospheres (4500 p.s.i.). Pressures in the range of 40 to 100 atmospheres are usually preferred.

Substantially pure methane or product fuel gas having a gross heating value of about 1000 B.t.u. per s.c.f. may be produced in the process. The methane product, after removal of the by-product water, carbon dioxide, and hydrogen sulfide, if present, is separated from the carbon monoxide and hydrogen products. Carbon monoxide and hydrogen are recycled to the reactor and converted to methane; the ultimate major products of the process are methane and by-product carbon dioxide. Hydrogen sulfide, if present, is separated from the product gas with the carbon dioxide or separately recovered, e.g. by the Rectisol process. Small amounts of nitrogen which may be contained in the feed material are converted to ammonia and separated from the product gas with water in the separation system.

It is a principal object of the present invention to provide a continuous process for economically and efficiently producing methane from various carbonaceous fuels of higher molecular weight than methane by non-catalytic partial oxidation with oxygen.

Another object of this invention is to provide a process for producing a fuel gas having a relatively high methane content from higher molecular weight carbonaceous fuels by non-catalytic partial oxidation with simultaneous conversion of carbon monoxide and hydrogen to methane.

DESCRIPTION OF THE INVENTION

The present invention relates to a continuous process for the production of methane by direct non-catalytic partial oxidation of a carbonaceous fuel of higher molecular weight than methane. The oxidation reaction is carried out in the presence of carbon monoxide and hydrogen, and optionally, also with steam or water. In a preferred embodiment, the carbon monoxide and hydrogen contained in the reaction product comprise the hydrogen and carbon monoxide supplied as reactants, preferably in admixture with the carbonaceous fuel.

The term "carbonaceous fuel," as used herein, is intended to include various materials such as hydrocarbons of higher molecular weight than methane, for example, ethane, propane, butane, liquefied petroleum gas, gasoline, naphtha, kerosine, crude petroleum, crude residum, shale oil, tar sand oil; aromatic hydrocarbons, such as cycle gas oil from fluid catalytic cracking operations, furfural extract of coker gas oil, and Udex raffinate; asphalt, coal tar; petroleum coke; various coals, e.g. bituminous coal, anthracite coal; cannel coal; lignite; gilsonite; refinery waste gases, particularly those containing hydrogen and hydrocarbons; oxygenated hydrocarbonaceous materials, such as alcohols, ketones, aldehydes, phenols, and carbohydrates. Carbon produced in the partial oxidation reaction is preferably returned to the reaction zone as part of the carbonaceous fuel.

Substantially pure oxygen, i.e. an oxygen-rich stream containing at least 95 mol percent oxygen, is preferred. While oxygen of lower purity can be used in the process, the products are diluted with nitrogen. By using substantially pure oxygen it is possible to produce substantially pure methane. The amount of oxygen supplied to the reaction zone is controlled relative to the amount of carbonaceous fuel supplied thereto to provide an atomic ratio of free oxygen to carbon in the reactants within the range of about 0.6 to 1.0 atom of oxygen per atom of carbon, or a ratio of moles $O_2$ per mole C in the range of 0.3 to 0.5. The lower limit of free oxygen, i.e. $O_2$, required is fixed by the amount of free carbon which can be tolerated in the product gas stream; the upper limit of oxygen is determined by the upper temperature limit chosen for the reaction.

Free carbon is produced in the reactor. Preferably the carbon so produced is recovered from the effluent gas stream from the reaction zone and recirculated to the reactor in admixture with carbonaceous feed material. Suitable methods for recovering carbon and returning it to the reaction zone are known; for example, carbon may be recovered by contacting the gas stream with oil or water. The carbon scrubbing operation is carried out at suitable temperatures and pressures to avoid complete vaporization of the scrubbing liquid, and excessive thermal decomposition if a hydrocarbon is employed as the scrubbing liquid. The gas stream from the reactor may be cooled prior to contact with the scrubbing liquid by means of suitable gas cooler, for example, a waste heat boiler. Preferably, all of the carbon produced in the reaction zone is returned to the reaction zone where it is consumed so that there is no net product of free carbon in the process. The carbon so returned is considered a part of the carbonaceous fuel to the reaction zone.

Carbon monoxide and hydrogen are supplied to the reaction zone preferably in an amount equal to that amount in the effluent gas stream from the reaction zone. By recycling all of the carbon monoxide and hydrogen from the effluent gas stream to the reaction zone, the process may be operated with no net production of carbon monoxide and hydrogen. It is possible to produce synthesis gas or mixtures of carbon monoxide and hydrogen, as well as methane, as products of the process or to produce hydrogen or carbon monoxide as a secondary product.

Carbon dioxide is produced as a by-product of the process in an amount equivalent to about .75 to 1.25 volume of carbon dioxide per volume of methane produced when all of the carbon monoxide and hydrogen are returned to the reaction zone.

Water may be supplied to the reaction zone in liquid or gaseous phase as mentioned herein above. The water may be introduced in admixture with oxygen or with the carbonaceous fuel supplied to the reaction zone. The amount of water supplied to the reaction zone is within the range of 0 to 2 parts by weight for each part by weight of carbonaceous fuel, and preferably within the range of 0.5 to 1.0 parts water per part fuel. Water whether supplied as liquid or as steam serves two purposes in the process. It is a temperature moderator so that by control of the amount of water or steam supplied to the reaction zone, the average temperature autogenously maintained in the reaction zone is kept within the desired temperature range of 1200 to 2200° F. When liquid water is supplied to the reaction zone it is converted quickly to steam. Steam is a reactant in the reaction zone and provides hydrogen necessary for the production of methane from hydrogen-deficient fuels, particularly those containing less than about 2 atoms of hydrogen per atom of carbon.

The quantity of oxygen which must be supplied to the reaction zone is determined by the permissible quantity of free carbon which can be tolerated in the effluent gas stream from the reaction zone. Generally it is desirable to limit the supply of free oxygen to the reaction zone to an amount such that 2 to 30 percent of the carbon supplied to the reaction zone in the carbonaceous fuel is discharged from the reaction zone as free carbon. It is postulated that the carbon which appears in the product gas stream from the reaction zone does not necessary represent carbon which has simply remained unreacted in passing through the reaction zone. It is considered more probable that the carbon which appears in the product stream has been at least in part formed from carbonaceous reaction products by secondary reactions occurring within the reaction zone. The quantity of carbon in the carbonaceous fuel, is a useful parameter in the process.

The carbon dioxide produced as a by-product of the reaction may be removed from the product by a suitable conventional separation process, such as cryogenic separation, absorption with a suitable agent such as an aqueous solution of an amine, particularly monoethanolamine, or a hot aqueous solution of potassium carbonate, or by a combination of such processes.

With a sulfur-containing fuel, sulfur compounds, particularly hydrogen sulfide and carbonyl sulfide, will appear in the product gas. These by-products may be removed simultaneously with the carbon dioxide by means of the Rectisol and Purisol systems as described, for example, in Industrial and Engineering Chemistry, volume 62, No. 7, July 1970, pp. 39–43.

The methane may be removed from the product gas stream, after the removal of water, carbon dioxide, and other acid gases as described above, by cryogenic purification. That is, by cooling the mixture of carbon monoxide, hydrogen and methane to a temperature below the condensation temperature of the methane, it may be liquefied and separated from the carbon monoxide and hydrogen as a condensate. Carbon monoxide and hydrogen, which may contain unrecovered methane are then preferably recycled in their entirety to the reaction zone. It is not necessary to remove all of the methane or carbon dioxide from the recycle gas stream since the amount which is carried back into the reaction zone simply reduces the net production of methane on a per pass basis. The overall yield of methane is substantially unaffected by the recycle of methane with carbon monoxide and hydrogen.

In summary, a preferred embodiment of the invention involves charging to a gas generation zone which consists of an unpacked reaction chamber, a carbonaceous fuel, steam, oxygen, carbon monoxide and hydrogen in relative proportions such that the temperature of the reaction zone is autogenously maintained above 1200° F., preferably not above 1800° F., and the carbon content of the product is maintained within the range of 5 to 25 percent of the carbon contained in the carbonaceous fuel supplied to the process. Effluent gas from the reaction zone is preferably cooled to a temperature below the dew point of water, substantially completely dehydrated, and further cooled to a temperature below the methane liquefaction temperature. Water, carbon dioxide and methane are sequentially removed from the residual gas stream as its temperature is reduced, and the remaining carbon monoxide and hydrogen are returned to the reaction zone.

The reaction zone is preferably a conventional Texaco Synthesis Gas Generator which comprises a vertical cylindrical steel pressure vessel lined with refractory. The reaction zone is free from packing or catalyst material and provides for unobstructed flow of gases therethrough. Suitable gas generators are disclosed in U.S. Pats. 2,818,326 and 3,000,711 to duBois Eastman et al. The various feed streams are introduced into the reaction chamber, preferably at ambient temperature or the temperature resulting from compression of the gaseous feed stream and the addition of steam. The feed temperature is preferably within the range of 100 to 300° F. A burner of the type described in U.S. Pat. 2,928,460 to duBois Eastman et al. may be used advantageously to introduce the various feed streams into the reaction zone.

The size of the reaction chamber is selected so that the advantage residence time of the reactants and resulting reaction products within the reactor is within the range of 0.5 to 20 second preferably 1 to 3 seconds. Average residence time as used herein may be determined by dividing the flow rate by the time period and multiplying by the volume of the reactor. For example, the reaction time in seconds may be determined by dividing the volume of reactor effluent produced in one hour, calculated at reactor temperature and pressure, by 3600 and multiplying by the volume of the reactor.

DESCRIPTION OF THE PREFERRED EMBODIMENT

A preferred embodiment of the process of this invention is illustrated diagrammetrically in the accompanying figure.

With reference to the figure, which illustrates a specific example of an application of the process of this invention to the production of methane from a liquid hydrocarbon air is rectified in a rectification plant 1 to yield substantially pure oxygen. Oxygen from the air rectification plant is passed at the desired gasification pressure, e.g. 600 p.s.i., through line 2 to a gas generator 3. Steam from a suitable source is supplied from line 5 to line 2 wherein it is mixed with the oxygen feed to gas generator.

Carbonaceous fuel, preferably at ambient temperature, is supplied through line 4 to the synthesis gas generator 3. The oxygen stream and the fuel stream preferably are separately introduced into and mixed with one another within the gas generator, preferably as described in U.S. Pat. 2,928,460, previously mentioned. Steam supplied to the gas generator may be fed either in admixture with the oxygen or the carbonaceous fuel. A preferred synthesis gas generator is one which comprises a compact, unpacked reaction zone having a relative small amount of surface in relation to its volume as disclosed in U.S. Pat. 2,582,938 to duBois Eastman et al.

Carbon separated from the product gas stream from the gas generator as described hereinafter is preferably supplied to the gas generator as part of the carbonaceous fuel. A gas stream rich in carbon monoxide and hydrogen from any suitable source, and preferably that from the effluent stream from the reaction zone, is supplied to the gas generator 3 from line 7 through line 4. The carbon monoxide and hydrogen, free carbon, and hydrocarbon oil are preferably premixed and supplied to the gas generation zone via line 4 through the central conduit of a burner of the type disclosed in U.S. Pat. 2,928,462; oxygen and steam are preferably supplied through the annulus of the burner.

The synthesis gas generator is operated at an autogenous temperature of 1200 to 1800° F. Effluent product gas from the gas generator containing hydrogen, carbon monoxide, methane, carbon dioxide, and water vapor, and usually containing also minor amounts of nitrogen, ammonia, argon, and gaseous sulfur compounds derived from the fuel oil, are discharged from the synthesis gas generator to a boiler 9 which cools the hot gas stream from the gas generation temperature to a temperature below about 700° F., suitably about 600° F., and produces high pressure (600 p.s.i.) steam which may be used in the process as a source of power in the air rectification unit. The cooled gas stream is discharged from the boiler 9 to a carbon removal tower 11 in which the gas stream is contacted with oil which removes solid particles, e.g unconverted carbon or soot, from the gas stream. Alternatively, but less desirably, water or a mixture of water and oil may be supplied to the carbon removal tower 11 as a gas scrubbing medium.

In the preferred embodiment of this illustrative example, wherein the carbonaceous fuel is a liquid hydrocarbon, the liquid hydrocarbon fuel oil from a suitable source is preferably introduced to the system through line 12 to carbon removal tower 11 where it serves to recover the carbon or soot from the gas stream. The resulting mixture of oil and carbon from carbon removal tower 11 is passed through line 6 to gas generator 3 via line 4. Optionally, carbon fuel oil may be introduced directly to the gas generator through valve 10 to line 4.

The gas stream, from which the carbon has been removed, which consists essentially of carbon monoxide, hydrogen, methane, carbon dioxide, and water vapor, and which may contain also some nitrogen or ammonia and hydrogen sulfide or carbonyl sulfide, is passed through line 13 to a low pressure boiler 14 for recovery of heat from the gas stream from boiler 14, suitably at a temperature of about 400° F., is passed to a cooler 15 through line 16 and further cooled in cooler 15 to condense water which is separated from the gas stream in separator 17. Ammonia present in the gas stream is separated therefrom with the water. The partially dried gas then passes through a drier 18 containing alumina to reduce the water vapor to less than 2 parts per million (i.e. to a dew point less than −60° F.). Silica gel or other desiccant may be used in place of alumina in the drier.

The dry gas stream is further cooled in heat exchanger 19 and passed to a $CO_2$ removal system 21, e.g. a Rectisol gas purification system, wherein carbon dioxide, and hydrogen sulfide and carbonyl sulfide, if present, are removed from the dry gas stream. In the $CO_2$ separation system, the feed gas is cooled to a temperature below the dew point of carbon dioxide thus effecting condensation of a major portion of the carbon dioxide (generally about 60 to 80 percent), which is separated from the uncondensed residual gas stream. One specific arrangement of apparatus for removing carbon dioxide from a gas stream by condensation is described in U.S. Pat. 3,001,373 to duBois Eastman et al.

Following the removal of the carbon dioxide, the residual gas stream comprising carbon monoxide, hydrogen and methane together with some residual carbon dioxide, is further cooled in heat exchanger 23 to a temperature below the condensation temperature of methane effecting condensation of the major portion of the methane which is separated in the methane separation system 24 from the uncondensed residual gas stream as a product of the process. Condensed methane is revaporized in the methane separation system and is discharged through line 26 as product. Cryogenic systems for the removal of methane from gases comprising hydrogen are known in the art.

Some hydrogen, carbon monoxide, nitrogen, or inert gases may be present in the methane. Depending upon the effectiveness of the air rectification system, it is usually possible to produce a product gas comprising substantially pure methane and having a heating value of 950 to 1000 B.t.u. per cubic foot.

Residual gases from the methane removal system 24 consisting essentially of carbon monoxide and hydrogen are delivered to line 7 for reintroduction to the gas generator with the carbonaceous fuel.

The following examples illustrate one preferred embodiment of the operation of the process of this invention for the production of methane from heavy fuel oil and oxygen. These examples are illustrative of a preferred mode of operation but are not to be construed as limiting the scope of our invention.

EXAMPLES

California reduced crude oil having the following analysis in weight percent is employed as feed to the process of this invention for the production of methane.

Ultimate analysis of oil

| | |
|---|---|
| Carbon | 86.05 |
| Hydrogen | 11.26 |
| Sulfur | 1.95 |
| Nitrogen | 0.70 |
| Ash | 0.04 |
| Total | 100.00 |

Inspection data

| | |
|---|---|
| API gravity | 13.0 |
| Viscosity, Saybolt seconds furol @ 122° F. | 765.0 |
| Heat of combustion, B.t.u. 1 lb. | 18,402 |

Example 1

The fuel oil at the rate of 219.7 pounds per hour is mixed with 7.6 pounds per hour of carbon recovered from the process and the mixture charged at the rate of 227.3 pounds per hour to a gas generator as described herein. The volume of the gas generator reaction zone is 2.14 cubic feet. The fuel oil mixture, steam, carbon monoxide, hydrogen, and oxygen are charged into the gas generator and reacted with one another at autogenous temperature. In this example, the fuel oil mixture, steam, carbon monoxide and hydrogen are mixed and charged into the reaction zone of the gas generator through the central orifice of a concentric, two-conduit, dual orifice burner and 100% pure oxygen is introduced through the annular conduit and orifice as already well known in the art.

The quantities and temperatures of the various feed streams are shown in the following table.

| | Temp., ° F. | Quantity |
|---|---|---|
| Component: | | |
| Oxygen | 100 | 2,970 s.c.f.h. |
| Oil | 250 | 219.7 lb./hr. |
| Carbon | 250 | 7.6 lb./hr. |
| Steam | 600 | 329.5 lb./hr. |
| Hydrogen | 250 | 5,620 s.c.f.h. |
| Carbon monoxide | 250 | 6,880 s.c.f.h. |

NOTE.—S.c.f.h.=Standard cubic feet per hour (60° F. at atmospheric pressure).

Product gas of the following composition is produced at the rate of 24,803 s.c.f.h.

GENERATOR EXIT GAS

| | Quantity, s.c.f.h. | Composition, vol. percent |
|---|---|---|
| Component: | | |
| Carbon monoxide | 6,880 | 27.75 |
| Hydrogen | 5,620 | 22.66 |
| Carbon dioxide | 3,305 | 13.32 |
| Water vapor | 6,267 | 25.27 |
| Methane | 2,660 | 10.72 |
| Nitrogen | 21 | .08 |
| Hydrogen sulfide | 48 | .19 |
| Carbonyl sulfide | 2 | .01 |
| Totals | 24,803 | 100.00 |

The reaction is conducted at a pressure of 1000 p.s.i.g. at an autogenous temperature of 1800° F. at the exit from the reaction zone. The average residence time in the reactor is calculated as 5.0 seconds. The methane content of the generator exit gas, dry basis, is 14.35 volume percent.

Unconverted carbon at the rate of 7.6 pounds per hour is separated from this raw product gas and returned to the gas generator with the oil feed. Water, carbon dioxide, hydrogen sulfide, carbonyl sulfide and nitrogen (as $NH_3$) are separated from the raw product gas as by-products of the process. Methane is recovered as a high B.t.u. product gas at the rate of 2,660 s.c.f.h., and carbon monoxide and hydrogen, amounting to 12,500 s.c.f.h. are returned to the gas generator for conversion to methane.

The overall results are shown in the following table:

| | | |
|---|---|---|
| Oil feed to process | lb./hr. | 219.7 |
| Methane product | s.c.f.h. | 2,660 |
| Carbo ndioxide | s.c.f.h. | 3,305 |
| Hydrogen sulfide and other gases | s.c.f.h. | 61 |

The thermal efficiency of conversion from oil to methane, basis heating value of the fuel oil and methane product, is 66.5 percent.

Example 2

In another run in the same gas generator at the same pressure and with the same fuel oil and otherwise the same conditions except that less steam, i.e., one pound of steam per pound of oil, is supplied to the gas generator, the quantities and temperature of the various feed streams are shown in the following table

| Component: | Temp., °F. | Quantity |
|---|---|---|
| Oxygen | 100 | 3,137 s.c.f.h. |
| Oil | 250 | 286.2 lb./hr. |
| Carbon | 250 | 49.4 lb./hr. |
| Steam | 600 | 286.2 lb./hr. |
| Hydrogen | 250 | 4,641 s.c.f.h. |
| Carbon monoxide | 250 | 7,859 s.c.f.h. |

The product gas generated at the rate of 24,708 s.c.f.h. has the composition shown in the following table

| Companent | Quantity, s.c.f.h. | Composition, vol. percent |
|---|---|---|
| Carbon monoxide | 7,859 | 31.80 |
| Hydrogen | 4,641 | 18.78 |
| Carbon dioxide | 3,958 | 16.02 |
| Water vapor | 4,360 | 17.65 |
| Methane | 3,797 | 15.37 |
| Nitrogen | 27 | 0.11 |
| Hydrogen sulfide | 61 | 0.25 |
| Carbonyl sulfide | 5 | 0.02 |
| Totals | 24,708 | 100.00 |

Unconverted carbon at the rate of 49.4 pounds per hour is separated from the raw product gas and returned to the gas generator with the oil feed.

The autogenous reaction zone temperature in this case is 1748° F. and the residence time is calculated as 5.2 seconds. The methane content of the generator exit gas is 18.66 volume percent, dry basis.

The overall conversion results are shown below.

Oil feed to the process _____ lb./hr__ 286.2
Methane product _____ s.c.f.h__ 3,797
Carbon dioxide _____ s.c.f.h__ 3,958
Hydrogen sulfide and other gases _____ s.c.f.h__ 93

The thermal efficiency, i.e., the heating value of the methane produced divided by the heating value of the oil feed and multiplied by 100 is 72.8 percent.

It will be apparent to those skilled in the art that the process of this invention is useful for conversion of various carbonaceous fuels to methane and that carbon monoxide, hydrogen, and mixtures thereof with one another and with various hydrocarbons, oxygenated hydrocarbons and other carbonaceous fuels, may be employed as supplemental or as principal feed materials for the process.

We claim:

1. A process for the production of methane from a liquid hydrocarbon which comprises continuously introducing oxygen $H_2O$, carbon monoxide, hydrogen, and said liquid hydrocarbon into an unpacked reaction zone maintained at a pressure within the range of 300 to 4500 pounds per square inch and an autogenous temperature within the range of 1200 to 2200° F. wherein the relative amounts of said oxygen and said liquid hydrocarbon are within the range of about 0.6 to 1.0 atom of oxygen per atom of carbon contained in said liquid hydrocarbon and sufficient to effect conversion of at least 70 percent of the carbon contained in said hydrocarbon to gaseous reaction products while maintaining an average temperature in said reaction zone within said temperature range and the relative proportions of $H_2O$ to carbonaceous fuel are within the range of about 0.0 to 2.0 pounds of $H_2O$ per pound of said liquid hydrocarbon; discharging as an effluent stream from said reaction zone products of reaction comprising carbon monoxide, hydrogen, methane, carbon dioxide and water vapor; separating water and carbon dioxide from said effluent stream; separately recovering substantially pure methane from said effluent stream; and passing substantially all of the carbon monoxide and hydrogen contained in said effluent stream to said reaction zone.

2. A process for the production of a methane-rich gas by the partial oxidation of a carbonaceous fuel which comprises continuously introducing said carbonaceous fuel, free oxygen-containing gas, carbon monoxide, hydrogen and optionally $H_2O$ into an unpacked reaction zone free from catalyst and maintained at a pressure within the range of about 300 to 4500 pounds per square inch and an autogenous temperature within the range of about 1200 to 2200° F. wherein the relative amounts of said free oxygen-containing gas and said carbonaceous fuel are within the range of about 0.6 to 1.0 atom of oxygen contained in said free oxygen-containing gas per atom of carbon contained in said carbonaceous fuel and sufficient to ensure conversion of at least 70 percent of the carbon contained in said carbonaceous fuel to gaseous products of reaction in the relative proportions of $H_2O$ to carbonaceous fuel are within the range of about 0.0 to 2.0 pounds of $H_2O$ per pound of said carbonaceous fuel and sufficient to maintain the average temperature in said reaction zone within said temperature range; and discharging a stream of methane-rich effluent gas from said reaction zone comprising carbon monoxide, hydrogen, methane, carbon dioxide and water vapor.

3. The process according to claim 2 wherein said carbonaceous fuel is a hydrocarbon of higher molecular weight than methane.

4. The process of claim 3 wherein said carbonaceous fuel is selected from the group consisting of ethane, propane, butane, liquefied petroleum gas, gasoline, naphtha, kerosine, crude petroleum, crude residuum, shale oil, tar sand oil; aromatic hydrocarbons, such as cycle gas oil from fluid catalytic cracking operations, furfural extract of coker gas oil, asphalt, coal tar; petroleum coke; various coals, e.g. bituminous coal, anthracite coal, cannel coal; lignite; gilsonite; refinery waste gases containing hydrogen and hydrocarbons; oxygenated hydrocarbonaceous materials including alcohols, ketones, aldehydes, phenols, and carbohydrates; particulate carbon; and mixtures thereof.

5. A process according to claim 2 wherein from 70 to 97 percent of the carbon contained in said carbonaceous fuel is converted to gaseous products of reaction whereby solid carbon is discharged from said reaction zone in said effluent stream of reaction products and said carbon is separated from said effluent stream and supplied to said reaction zone as a part of said carbonaceous fuel.

6. The process of claim 2 wherein the amount of said methane in said methane-rich effluent gas is at least 10 mole percent.

7. The process of claim 2 provided with the added steps of separating $H_2O$, $CO_2$ and any $H_2S$ contained therein from said effluent gas stream, separately recovering substantially pure methane or product fuel gas from said effluent stream; and introducing at least a portion of the carbon monoxide, and the hydrogen remaining in said effluent gas stream into said reaction zone as at least a portion of said hydrogen and carbon monoxide.

8. The process of claim 2 wherein said free oxygen-containing gas is selected from the group consisting of air, oxygen-enriched air (greater than 21 mole percent $O_2$) and substantially pure oxygen (at least 95 mole percent $O_2$).

9. The process of claim 2 with the added steps of cooling the effluent stream from the reaction zone by indirect heat exchange with water thereby producing steam and introducing at least a portion of said steam into said reaction zone.

References Cited

UNITED STATES PATENTS

| | | | |
|---|---|---|---|
| 2,654,663 | 10/1953 | Gorin | 48—210 |
| 2,840,462 | 6/1958 | Gorin | 48—203 X |
| 2,976,134 | 3/1961 | Paull | 48—215 |
| 3,194,644 | 7/1965 | Gorin et al. | 48—197 |
| 3,531,267 | 9/1970 | Gould | 48—214 X |
| 3,556,749 | 1/1971 | Spacil | 48—210 X |

MORRIS O. WOLK, Primary Examiner

R. E. SERWIN, Assistant Examiner

U.S. Cl. X.R.

48—201, 210, 213; 252—373